US012314415B2

(12) United States Patent
Soeda et al.

(10) Patent No.: US 12,314,415 B2
(45) Date of Patent: May 27, 2025

(54) CONTROL METHOD, CONTENTS MANAGEMENT SYSTEM, RECORDING MEDIUM, AND DATA STRUCTURE

(71) Applicant: Panasonic Intellectual Property Corporation of America, Torrance, CA (US)

(72) Inventors: Junichiro Soeda, Nara (JP); Junji Michiyama, Fukuoka (JP); Yuji Unagami, Osaka (JP); Motoji Ohmori, Osaka (JP); Yuuki Hirose, Osaka (JP); Tetsuji Fuchikami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 668 days.

(21) Appl. No.: 17/147,941

(22) Filed: Jan. 13, 2021

(65) Prior Publication Data

US 2021/0133343 A1 May 6, 2021

Related U.S. Application Data

(63) Continuation of application No. PCT/JP2019/036906, filed on Sep. 20, 2019.

(Continued)

(51) Int. Cl.

*G06F 21/60* (2013.01)
*G06F 21/31* (2013.01)
*G06F 21/62* (2013.01)

(52) U.S. Cl.

CPC .......... *G06F 21/6218* (2013.01); *G06F 21/31* (2013.01)

(58) Field of Classification Search

CPC ............................ G06F 21/6218; G06F 21/31

(Continued)

(56) References Cited

U.S. PATENT DOCUMENTS 7,813,822 B1 * 10/2010 Hoffberg ................ H04N 7/163 381/73.1
8,316,237 B1 * 11/2012 Felsher ................ H04L 63/061 380/282

(Continued)

FOREIGN PATENT DOCUMENTS

CN 108647971 A * 10/2018
JP H08315106 A * 11/1996

(Continued)

OTHER PUBLICATIONS

Wei-Dong, Zhu, Jim Ilardi, Deborah Matamoros, Trina D. Morgans, Paula Muir, Hassan A. Shazly, Edward E. Stonesifer, Vanessa T. Stonesifer, and Sebastian Welter. IBM Content Manager OnDemand Guide. IBM Redbooks, 2016. (Year: 2016).*

(Continued)

*Primary Examiner* — Luu T Pham
*Assistant Examiner* — Walter J Malinowski
(74) *Attorney, Agent, or Firm* — Wenderoth, Lind & Ponack, L.L.P.

(57) ABSTRACT

A control method that is used in a content management system including a plurality of servers, each holding a distributed ledger, and that is executed by one of the servers includes acquiring first transaction data from a providing device and storing the acquired first transaction data in the distributed ledger held by each server, the first transaction data including identification information for specifying content provided by the providing device and permission/prohibition information regarding whether to permit or prohibit the browsing of the content.

8 Claims, 15 Drawing Sheets

Related U.S. Application Data

(60) Provisional application No. 62/748,629, filed on Oct. 22, 2018.

(58) Field of Classification Search
USPC .............................................................. 726/4
See application file for complete search history.

(56) References Cited

U.S. PATENT DOCUMENTS

| | | | | |
|---|---|---|---|---|
| 9,430,673 | B1 * | 8/2016 | Bowers | H04N 21/41407 |
| 10,762,052 | B2 * | 9/2020 | Bailey | G06F 16/176 |
| 11,064,102 | B1 * | 7/2021 | Helpingstine | H04W 4/022 |
| 2007/0298770 | A1 * | 12/2007 | Lee | H04W 4/12 455/412.2 |
| 2008/0103906 | A1 * | 5/2008 | Singh | G06Q 30/0277 705/14.51 |
| 2009/0171686 | A1 * | 7/2009 | Eberstadt | G06Q 30/02 705/319 |
| 2009/0287837 | A1 * | 11/2009 | Felsher | G06F 21/6245 709/229 |
| 2013/0159021 | A1 * | 6/2013 | Felsher | G16H 10/60 705/3 |
| 2013/0179911 | A1 * | 7/2013 | Dang | H04N 21/44218 725/12 |
| 2015/0106288 | A1 * | 4/2015 | Holman | G06F 21/6245 705/325 |
| 2015/0324219 | A1 * | 11/2015 | Fitzgerald | G06F 9/4856 718/1 |
| 2017/0103458 | A1 * | 4/2017 | Pierce | G06Q 40/04 |
| 2017/0250816 | A1 * | 8/2017 | Popa | G06F 21/62 |
| 2017/0372417 | A1 * | 12/2017 | Gaddam | G06Q 20/06 |
| 2018/0068019 | A1 * | 3/2018 | Novikoff | G06F 16/7867 |
| 2018/0082024 | A1 | 3/2018 | Curbera et al. | |
| 2018/0143995 | A1 * | 5/2018 | Bailey | G06F 21/6218 |
| 2018/0260125 | A1 * | 9/2018 | Botes | G06F 3/065 |
| 2018/0285996 | A1 * | 10/2018 | Ma | H04L 9/3297 |
| 2018/0315116 | A1 * | 11/2018 | Medina | G06Q 30/0621 |
| 2018/0374173 | A1 * | 12/2018 | Chen | G06Q 10/10 |
| 2019/0005470 | A1 * | 1/2019 | Uhr | H04L 9/3239 |
| 2019/0012249 | A1 * | 1/2019 | Mercuri | G06F 9/542 |
| 2019/0147510 | A1 * | 5/2019 | Soeda | G06Q 20/28 705/26.1 |
| 2019/0289011 | A1 * | 9/2019 | Kamiya | H04L 63/0428 |
| 2019/0324439 | A1 * | 10/2019 | Cella | G06F 18/217 |
| 2019/0354693 | A1 * | 11/2019 | Yoon | H04L 9/30 |
| 2019/0356609 | A1 * | 11/2019 | Grunwald | G06F 16/275 |
| 2019/0370358 | A1 * | 12/2019 | Nation | G06F 16/1805 |
| 2020/0050780 | A1 * | 2/2020 | Uhr | H04L 9/0637 |
| 2020/0117690 | A1 * | 4/2020 | Tran | G06F 16/90332 |
| 2020/0119916 | A1 * | 4/2020 | Pickhardt | H04L 9/3236 |
| 2020/0120023 | A1 * | 4/2020 | Munson | G06F 9/45516 |
| 2021/0091924 | A1 * | 3/2021 | Holmberg | G06Q 20/065 |
| 2021/0133343 | A1 * | 5/2021 | Soeda | G06F 21/645 |
| 2022/0148710 | A9 * | 5/2022 | Buckland | G16H 30/40 |

FOREIGN PATENT DOCUMENTS

| | | | | | |
|---|---|---|---|---|---|
| JP | 2004054672 | A | * | 2/2004 | |
| JP | 2004-78302 | | | 3/2004 | |
| JP | 2012234237 | A | * | 11/2012 | |
| JP | 2016-27465 | | | 2/2016 | |
| JP | 2016027465 | A | * | 2/2016 | |
| JP | 2016027465 | A1 | * | 2/2016 | |
| JP | 2016085594 | A | * | 5/2016 | |
| JP | 2016-208347 | | | 12/2016 | |
| JP | 2018022346 | A | * | 2/2018 | |
| JP | 2018-136662 | | | 8/2018 | |
| JP | 6417467 | B1 | * | 11/2018 | |
| KR | 20110067193 | A | * | 6/2011 | |
| KR | 101882802 | B1 | * | 7/2018 | |
| WO | WO-2006137171 | A1 | * | 12/2006 | H04M 1/72577 |
| WO | 2017/148245 | | | 9/2017 | |
| WO | WO-2018056445 | A1 | * | 3/2018 | G06Q 20/32 |
| WO | WO-2018154793 | A1 | * | 8/2018 | C06F 12/00 |
| WO | WO-2018194351 | A1 | * | 10/2018 | G06F 21/10 |

OTHER PUBLICATIONS

Ylitalo, Katri, and Yki Kortesniemi. "Privacy in distributed reputation management." In Workshop of the 1st International Conference on Security and Privacy for Emerging Areas in Communication Networks, 2005., pp. 63-71. IEEE, 2005. (Year: 2005).*

Sonntag, Michael. "Voluntariness of permissions required for security measures." In Proceedings. 30th Euromicro Conference, 2004., pp. 551-557. IEEE, 2004. (Year: 2004).*

Gilda, Shlok, and Maanav Mehrotra. "Blockchain for student data privacy and consent." In 2018 International Conference on Computer Communication and Informatics (ICCCI), pp. 1-5. IEEE, 2018. (Year: 2018).*

International Search Report (ISR) issued on Dec. 24, 2019 in International (PCT) Application No. PCT/JP2019/036906.

Office Action issued Mar. 15, 2024 in Chinese Patent Application No. 201980049696.8, with English translation of Search Report.

* cited by examiner

FIG. 6

| IMAGE ID | CONDITION TYPE | AUTHORITY | PROVIDED DATE AND TIME | SIGNATURE | |
|---|---|---|---|---|---|
| 002 | 1 | A,B | 2018/07/25 18:15:00 | [A] | D1 |
| 021 | 3 | X,Y | 2018/07/25 22:00:00 | [X] | D2 |

FIG. 7

| CONDITION TYPE | CONTENT | NUMBER OF AUTHORITIES WHOSE CONSENT IS NECESSARY |
|---|---|---|
| 1 | BROWSABLE WITHOUT CONSENT | 0 |
| 2 | BROWSABLE WITH CONSENT OF ONE AUTHORITY | 1 |
| 3 | BROWSABLE WITH CONSENT OF TWO AUTHORITIES | 2 |
| 4 | NON-BROWSABLE | INFINITE |

FIG. 8

| IMAGE ID | PERSON WHO REQUESTED BROWSING | REQUESTED DATE AND TIME | SIGNATURE |
|---|---|---|---|
| 002 | P | 2018/07/30 21:10:00 | [30A] |

| IMAGE ID | PERSON WHO GRANTED CONSENT | PERMITTED DATE AND TIME | SIGNATURE |
|---|---|---|---|
| 021 | X,Y | 2018/07/30 21:20:00 | [30A] |

| IMAGE ID | PERSON WHO REQUESTED CHANGE | REQUESTED DATE AND TIME | CONDITION TYPE BEFORE CHANGE | CONDITION TYPE AFTER CHANGE | SIGNATURE | |
|---|---|---|---|---|---|---|
| 002 | P | 2018/08/15 2:00:00 | 1 | 2 | [P] | D5 |
| 021 | A | 2018/08/15 22:30:00 | 2 | 1 | [A] | D6 |

FIG. 11

| | IMAGE ID | PERSON WHO REQUESTED CHANGE | PERSON WHO CONSENTED TO CHANGE | REQUESTED DATE AND TIME | CONDITION TYPE BEFORE CHANGE | CONDITION TYPE AFTER CHANGE | SIGNATURE |
|---|---|---|---|---|---|---|---|
| D7 | 002 | P | A | 2018/08/15 2:05:00 | 1 | 2 | [30A] |
| D8 | 021 | A | A,B | 2018/08/15 22:35:00 | 2 | 1 | [30A] |

CONTROL METHOD, CONTENTS MANAGEMENT SYSTEM, RECORDING MEDIUM, AND DATA STRUCTURE

CROSS REFERENCE TO RELATED APPLICATIONS

This application is a U.S. continuation application of PCT International Patent Application Number PCT/JP2019/036906 filed on Sep. 20, 2019, claiming the benefit of priority of U.S. Provisional Patent Application No. 62/748,629 filed on Oct. 22, 2018, the entire content of which are hereby incorporated by reference.

BACKGROUND

1. Technical Field

The present disclosure relates to a control method, a content management system, a recording medium, and a data structure.

2. Description of the Related Art

There are techniques related to security in technology for browsing content via a network (see Japanese Unexamined Patent Application Publication No. 2004-78302).

However, there is a problem of being unable to appropriately support a change made to information regarding whether to permit or prohibit the browsing of content.

SUMMARY

The present disclosure provides a control method and the like that appropriately manage whether to permit or prohibit the browsing of content.

A control method according to one aspect of the present disclosure is a control method that is used in a content management system including a plurality of servers, each holding a distributed ledger, and that is executed by one of the plurality of servers. The control method includes acquiring first transaction data from a providing device, the first transaction data including identification information for specifying content provided by the providing device and permission/prohibition information regarding whether to permit or prohibit browsing of the content, and storing the first transaction data acquired in the distributed ledger held by each of the plurality of servers.

It is to be rioted that such a generic or specific embodiment of the present disclosure may be implemented or realized as a system, a device, an integrated circuit, a computer program, or a computer-readable recording medium such as a CD-ROM, and the embodiment may also be implemented or realized as any combination of a system, a device, an integrated circuit, a computer program, or a recording medium.

The control method according to the present disclosure enables appropriately managing whether to permit or prohibit the browsing of content.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 6 is an illustration of store-request transaction data used to provide images according to the embodiment;

FIG. 7 is an illustration of condition types according to the embodiment;

FIG. 8 is an illustration of browsing-request transaction data used to request the browsing of an image according to the embodiment;

FIG. 9 is an illustration of browsing permission/prohibition transaction data used to permit the browsing of an image according to the embodiment;

FIG. 10 is an illustration of change-request transaction data used to request changes in condition type according to the embodiment;

FIG. 11 is an illustration of change-record transaction data used to record changes made to the condition type according to the embodiment;

DETAILED DESCRIPTION OF THE EMBODIMENT

Findings Forming Basis of Present Disclosure

Figure 1:
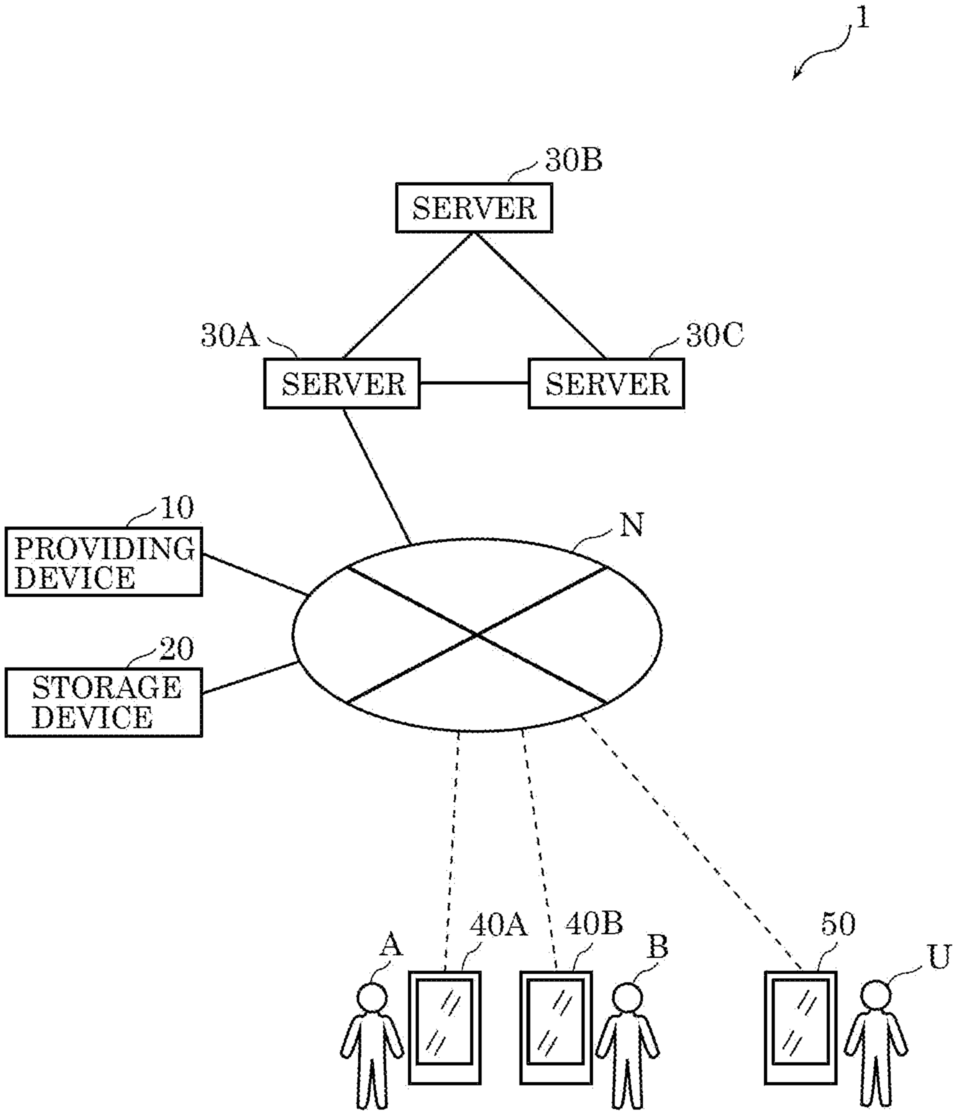
FIG. 1 is a block diagram schematically illustrating a configuration of a content management system according to an embodiment.

The inventors of the present disclosure have found that the following problems arise with the content browsing technique described in "Description of Related Art".

For example, there are cases where the content of a photograph in which a plurality of persons are captured as subjects are uploaded to a website. Such a photograph in which a plurality of persons are captured as subjects shows that these persons spent time together at the same time in the same place, and it can be said that the photograph implies some sort of relationship among these persons. Uploading such a photograph to a website can be thought to indicate that there is no problem in showing the photograph in public.

However, there is a problem of being unable to appropriately support changes made over time to information regarding whether to permit or prohibit the browsing of content.

Specifically, even if at the beginning of the upload, there is no problem in showing the photograph to the other persons (in other words, persons other than the subjects), a problem may arise later in showing this photograph to specified or unspecified other persons due to changes made over time to human relations or other factors. Even if how to handle the photograph has been promised among the persons who are the subjects of the photograph, there is no guarantee that the promise is always kept.

In view of this, the present disclosure provides a control method and the like that appropriately manage whether to permit or prohibit the browsing of content.

In order to solve this problem, a control method according to one aspect of the present disclosure is a control method that is used in a content management system including a plurality of servers, each holding a distributed ledger, and that is executed by one of the plurality of servers. The control method includes acquiring first transaction data from a providing device, the first transaction data including identification information for specifying content provided by the providing device and permission/prohibition information regarding whether to permit or prohibit browsing of the content, and storing the first transaction data acquired in the distributed ledger held by each of the plurality of servers.

According to the above-described aspect, the server stores information regarding whether to permit or prohibit the browsing of content as transaction data in the distributed ledgers. Since it is substantially impossible to tamper the transaction data stored in the distributed ledgers, the information regarding whether to permit or prohibit the browsing of content can be appropriately managed, including the history of changes made to the information. Accordingly, the control method according to the present disclosure enables appropriately managing whether to permit or prohibit the browsing of content.

For example, the content management system may further include a storage device that stores the content provided by the providing device. The control method may further includes when a browsing request to browse the content is received from a browsing device, determining whether or not to permit the browsing of the content at the browsing request with reference to at least the distributed ledger, and when it is determined that the browsing of the content is permitted, providing the content from the storage device to the browsing device.

According to the above-described aspect, the server references the transaction data stored in the distributed ledgers and determines whether to permit or prohibit the browsing of content. Since the transaction data is substantially impossible to tamper, whether to permit or prohibit the browsing of content can be appropriately determined based on the transaction data. Accordingly, the control method according to the present disclosure enables appropriately managing whether to permit or prohibit the browsing of content.

For example, the permission/prohibition information may include a condition that the browsing of the content is permitted when consent of an authority determined in advance for the content is acquired. The control method may further include when the browsing request to browse the content is received from the browsing device and when information indicating consent to the browsing of the content is further received from the authority, determining based on satisfaction of the condition that the browsing of the content is permitted at the browsing request.

According to the above-described aspect, when content is managed such that the browsing of the content is permitted with the consent of an authority, the server permits the browsing of the content when the consent of the authority has been acquired for a browsing request to browse the content. Also, the condition that the browsing of content is permitted with the consent of the authority is appropriately managed as transaction data in the distributed ledgers. In this way, the content management system enables appropriately managing whether to permit or prohibit the browsing of content while at the same time acquiring the consent of the authority.

For example, the content may be content of a photograph image or a moving image in which one or more persons are captured as a subject. The permission/prohibition information may include a total number of persons who each serve as the authority and whose consent is necessary to permit the browsing of the content, among the one or more persons.

According to the above-described aspect, the subject of content, e.g., a photograph or a moving image, serves as an authority, and the server controls whether to permit or prohibit the browsing of content with the consent of the subject serving as the authority. In this way, the content management system enables appropriately managing whether to permit or prohibit the browsing of content while at the same time acquiring the consent of the subject of the content.

For example, the control method may further include receiving second transaction data that includes information regarding a change in the permission/prohibition information, and storing the second transaction data received in the distributed ledger held by each of the plurality of servers.

According to the above-described aspect, the server stores changes made to the permission/prohibition information as transaction data in the distributed ledgers. Since the transaction data stored in the distributed ledgers is substantially impossible to tamper, it is possible to appropriately manage information regarding the permission/prohibition information, including the history of changes made to the information. Accordingly, the control method according to the present disclosure enables appropriately managing whether to permit or prohibit the browsing of content.

For example, the control method may further include when the second transaction data received includes information regarding a change made to increase a total number of persons whose consent is necessary to permit the browsing of the content, applying the change when information indicating consent to the change is received from at least one of one or more persons, and when the second transaction data received includes information regarding a change made to reduce the total number of persons whose consent is necessary to permit the browsing of the content, applying the change when information indicating consent to the change is received from all of the one or more persons.

According to the above-described aspect, in each of the cases where the total number of persons whose consent is necessary is increased in order to permit the browsing of content and where this number is reduced in order to permit the browsing of content, the server applies the change with appropriate consent. The aforementioned change made to increase the total number of persons imposes more restrictions on the browsing of content and therefore can be applied with relatively mild consent. On the other hand, the aforementioned change made to reduce the total number of persons imposes less restrictions on the browsing of content and therefore can be applied with relatively severe consent. Using this characteristic of changes, the content management system enables applying a change to the permission/prohibition information with the consent level that depends on the details of the change. Accordingly, the control method according to the present disclosure enables appropriately managing whether to permit or prohibit the browsing of content with more flexibility, using the characteristic of changes made to the permission/prohibition information.

For example, part or all of processing according to the control method may be implemented by executing a smart contract code stored in the distributed ledger held by each of the plurality of servers.

According to the above-described aspect, the server automatically executes a series of processing, such as the management of information regarding whether to permit or prohibit the browsing of content, in accordance with smart contract codes stored in the distributed ledgers and without intervention of the other persons or the other systems. Accordingly, the series of processing can be implemented with a higher level of safety by a smart contract. It is thus possible to more appropriately manage whether to permit or prohibit the browsing of content.

For example, when the first transaction data is stored in the distributed ledger held by each of the plurality of servers, each of the plurality of servers may execute a consensus algorithm to store the first transaction data in the distributed ledger.

According to the above-described aspect, the server executes the consensus algorithm to store the transaction data in the distributed ledgers. The execution of the consensus algorithm makes it easier to appropriately manage whether to permit or prohibit the browsing of content.

A content management system according to one aspect of the present disclosure is a content management system including a plurality of servers, each holding a distributed ledger. The content management system includes a processing unit that acquires first transaction data from a providing device, the first transaction data including identification information for specifying content provided by the providing device and permission/prohibition information regarding whether to permit or prohibit browsing of the content, and a ledger management unit that stores the first transaction data acquired, in the distributed ledger held by each of the plurality of servers.

According to the above-described aspect, it is possible to achieve similar effects to those achieved with the above-described control method.

A recording medium according to one aspect of the present disclosure is a non-transitory computer-readable recording medium having a computer program recorded thereon for causing a computer to execute the control method described above.

According to the above-described aspect, it is possible to achieve similar effects to those achieved with the above-described control method.

A data structure according to one aspect of the present disclosure is a data structure used in a content management system that includes a plurality of servers, each holding a distributed ledger. The data structure is included in first transaction data stored in the distributed ledger. The first transaction data includes identification information for uniquely specifying content provided by a providing device and managed by the content management system, permission/prohibition information regarding whether to permit or prohibit browsing of the content, information indicating an authority whose consent is necessary to permit browsing of the content, information indicating date and time when the content are provided, and a digital signature of a provider that has provided the content via the providing device.

According to above-described aspect, it is possible to achieve similar effects to those achieved with the above-described control method.

It is to be noted that such a generic or specific embodiment of the present disclosure may be implemented or realized as a system, a device, an integrated circuit, a computer program, or a computer-readable recording medium such as a CD-ROM, or may be implemented or realized as any combination of a system, a device, an integrated circuit, a computer program, and a recording medium.

Hereinafter, an embodiment will be described in detail with reference to the drawings.

Note that the embodiment described below illustrates a generic or specific example of the present disclosure. Numerical values, shapes, materials, constituent elements, positions of the constituent elements in the arrangement, forms of connection of the constituent elements, and so on in the following embodiment are mere examples and do not intend to limit the scope of the present disclosure. Among the constituent elements described in the following embodiment, those that are not recited in any independent claim, which represents the broadest concept of the present disclosure, are described as optional constituent elements.

Embodiment

The present embodiment describes content management system 1 and a control method and the like that appropriately manage whether to permit or prohibit the browsing of content. Although as an example, a case is described in which content managed by content management system 1 corresponds to a photograph image in which a person(s) is/are captured, the content may be a moving image in which a person(s) is/are captured, or may be a photograph or moving image created by a person.

FIG. 1 is a block diagram schematically illustrating a configuration of content management system 1 according to the present embodiment.

As illustrated in FIG. 1, content management system 1 includes providing device 10, storage device 20, servers 30A, 30B, and 30C, terminals 40A and 40B, and browsing device 50. These devices included in content management system 1 are communicably connected to one another via network N. Network N may be configured as any communication line or any communication network, examples of which include the Internet and carrier networks for mobile phones. The servers 30A, 30B, and 30C may also be referred to as "servers 30A and so on". The terminals 40A and 40B may also be referred to as "terminals 40A and so on".

Providing device 10 is a device that provides, as content, an image to be managed by content management system 1. Providing device 10 transmits the image to storage device 20 via network N. Providing device 10 also transmits transaction data to server 30A, the transaction data including identification information on the above image and permission/prohibition information (described later) indicating whether to permit or prohibit the browsing of the above image. Instead of transmitting the transaction data to server 30A, providing device 10 may transmit the transaction data to server 30B or 30C. The same applies to the following description.

Storage device 20 is a device that stores images provided by providing device 10.

Server 30A is one of a plurality of servers 30A, 30B, and 30C, each holding a distributed ledger. The distributed ledger of server 30A stores transaction data that includes identification information on images and permission/prohibition information on the images. The above-distributed ledger also stores a history of permission/prohibition information, a history of browsing requests made by browsing device 50, and other information. Upon receiving a request to browse an image from browsing device 50 via network N, server 30A determines whether or not to permit the browsing, and when having permitted the browsing, causes the image to be transmitted from storage device 20 to browsing device 50 via network N.

Servers 30B and 30C are devices that each have the same function as server 30A and each operate independently of server 30A. Note that the number of servers is not limited to three, and may be any plural number. Server 30A and so on are communicably connected to one another and may be connected to one another via network N.

Terminal 40A is an information terminal (e.g., a personal computer or a smartphone) of authority A determined in advance for an image managed by content management system 1. For example, authority A is a subject of a photograph image provided by providing device 10. Upon receiving a request to consent to the browsing of an image from servers 30A and so on, terminal 40A presents information on an inquiry about whether or not to consent to the browsing to authority A and provides information indicating whether or not to consent to the browsing to server 30A via network N.

Terminal 40B is an information terminal of authority B and has the same function as terminal 40A. Terminal 40B operates independently of terminal 40A. Note that the number of terminals 40A and so on is not to two, and there are the same number of terminals as the number of authorities.

Browsing device 50 is a device that browses images stored in storage device 20. For example, browsing device 50 is an information terminal of user U. When a request to browse an image has been received from user U and if the browsing request is permitted, browsing device 50 receives and displays the image from storage device 20 via network N.

Hereinafter, a configuration of each device in content management system 1 will be described in detail.

Figure 2:
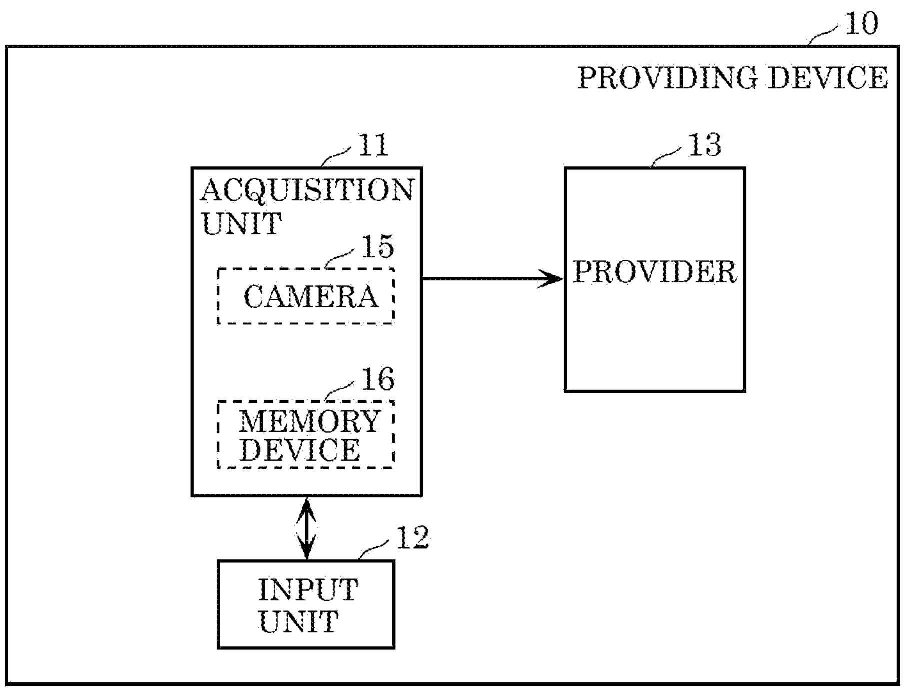
FIG. 2 is a block diagram schematically illustrating a configuration of a providing device according to the embodiment.

FIG. 2 is a block diagram schematically illustrating a configuration of providing device 10 according to the present embodiment.

As illustrated in FIG. 2, providing device 10 includes acquisition unit 11, input unit 12, and provider 13. The aforementioned functional units of providing device 10 may be implemented by, for example, a CPU using a memory and executing programs.

Acquisition unit 11 is a processing unit that acquires an image to be managed by content management system 1. There are various methods as the method for use in acquisition unit 11 to acquire an image. For example, acquisition unit 11 may include camera 15 and memory device 16, acquire an image by generating the image through image capture with camera 15, and temporarily store the acquired image in memory device 16. Acquisition unit 11 then transfers an image file stored in memory device 16 to provider 13 under the control of input unit 12.

Note that the configuration of acquisition unit 11 is not limited to the configuration including camera 15 and memory device 16. For example, acquisition unit 11 may include a communication interface and use the communication interface to acquire an image from the outside of providing device 10 via a communication line.

Input unit 12 is a processing unit that receives input of information for specifying an image provided from a user of providing device 10. Input unit 12 receives selection of an image to be provided to storage device 20 from among images stored in memory device 16, from the user of providing device 10 via an input interface (e.g., a keyboard, a mouse, and a patch panel) (not shown). Upon receiving the above selection, input unit 12 controls acquisition unit 11 so that the image is provided from acquisition unit 11 to provider 13.

Provider 13 is a processing unit that provides an image and identification information on the image to storage device 20 and transmits store-request transaction data to servers 30A and so on, the store-request transaction data including identification information on the provided image and permission/prohibition information regarding whether to permit or prohibit the browsing of the image. The identification information on the image may be any kind of information as long as the image can be uniquely specified from the other images. The permission/prohibition information is information indicating whether or not to permit the other persons to browse the image. Specifically, the permission/prohibition information is information indicating selection of one of a plurality of condition types, such as a condition type that permits the other persons to browse the image without the consent of authorities, a condition type that permits the other persons to browse the image with the consent of at least one authority, a condition type that permits the other persons to browse the image with the consent of all authorities, and a condition type that prohibits the other persons from browsing the image (in other words, a condition type that does not permit the other persons to browse the image even with the consent of authorities).

Figure 3:
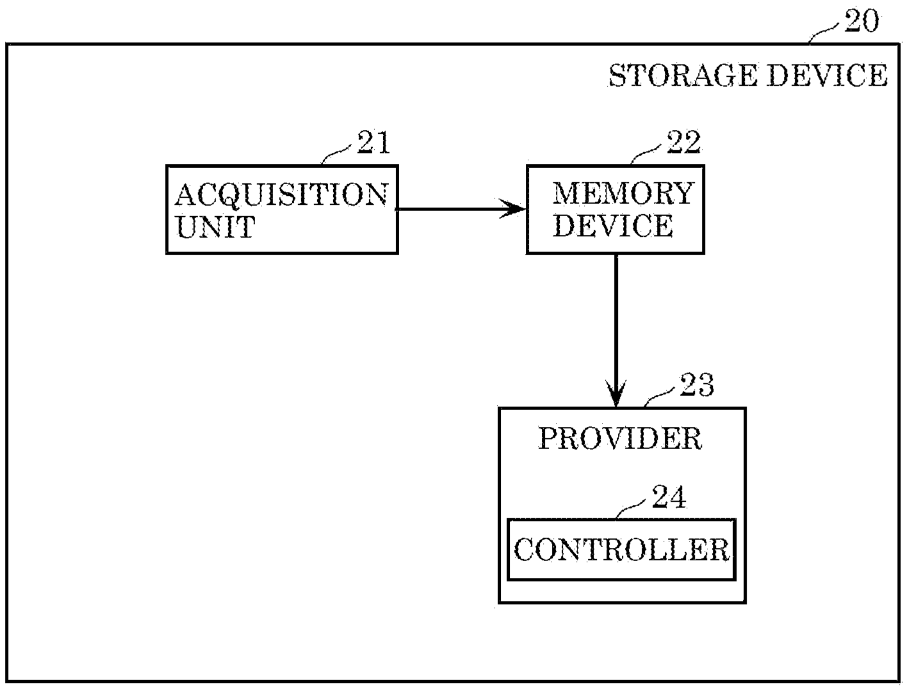
FIG. 3 is a block diagram schematically illustrating a configuration of a storage device according to the embodiment.

FIG. 3 is a block diagram schematically illustrating a configuration of storage device 20 according to the present embodiment.

As illustrated in FIG. 3, storage device 20 includes acquisition unit 21, memory device 22, and provider 23. The aforementioned functional units of storage device 20 may be implemented by, for example, a CPU using a memory and executing programs.

Acquisition unit 21 is a processing unit that acquires an image and identification information on the image from providing device 10. Acquisition unit 21 stores the acquired image in memory device 22 in association with the acquired identification information.

Memory device 22 stores images and identification information provided from providing device 10. Memory device 22 is a device into which images and identification information are written by acquisition unit 21 and from which images and identification information are read out by provider 23.

Provider 23 is a processing unit that provides an image stored in memory device 22 to browsing device 50. Provider 23 includes controller 24.

Controller 24 controls whether provider 23 provides an image stored in memory device 22 to browsing device 50. At this time, controller 24 acquires, from servers 30A and so on, identification information on the image that is permitted to be browsed by servers 30A and so on. Controller 24 then determines to provide the image specified by the acquired identification information to browsing device 50 and determines not to provide the other images to browsing device 50.

Provider 23 provides an image determined to be transmitted to browsing device 50 by reading out the image from among images stored in browsing device 50 and transmitting the read image to browsing device 50.

Figure 4:
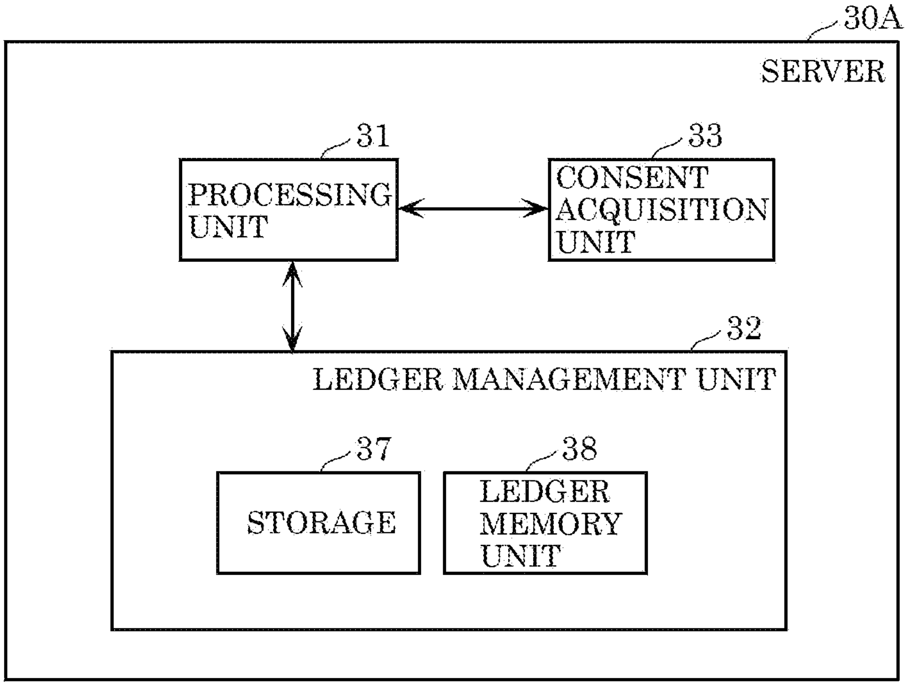
FIG. 4 is a block diagram schematically illustrating a configuration of a server according to the embodiment.

FIG. 4 is a block diagram schematically illustrating a configuration of server 30A according to the present embodiment. Note that servers 30B and 30C also have the same configuration as server 30A.

As illustrated in FIG. 4, server 30A includes processing unit 31, ledger management unit 32, and consent acquisition unit 33. The aforementioned functional units of server 30A may be implemented by, for example, a CPU using a memory and executing programs.

Processing unit 31 performs processing for managing whether to permit or prohibit the browsing of an image and conditions for permitting or prohibiting the browsing of the image. Upon receiving each of various requests or various types of transaction data from a device in content management system 1, processing unit 31 processes the received request or transaction data. Specifically, processing unit 31 performs the following processing.

(1) Processing unit 31 provides transaction data on a request to store an image (also referred to as store-request transaction data or first transaction data) to ledger management unit 32. Specifically, processing unit 31 receives store-request transaction data from providing device 10, the store-request transaction data including identification information on the image provided from providing device 10 to storage device 20 and permission/prohibition information regarding whether to permit or prohibit the browsing of the image. Then, processing unit 31 provides the received store-request transaction data to ledger management unit 32.

(2) Processing unit 31 provides transaction data indicating that there is a request to browse an image (also referred to as browsing-request transaction data) to ledger management unit 32. Specifically, processing unit 31 receives communication data including a request to browse an image from browsing device 50. In that case, processing unit 31 generates browsing-request transaction data indicating that there is a browsing request and provides the generated transaction data to ledger management unit 32.

(3) Processing unit 31 provides transaction data indicating that the browsing of an image is permitted or prohibited (also referred to as browsing permission/prohibition transaction data) to ledger management unit 32. Specifically, upon receiving communication data that includes a request to browse an image, processing unit 31 references conditions for permitting or prohibiting the browsing of the image requested to be browsed. In the case where the browsing of the image is permitted with the consent of an authority(ies), consent acquisition unit 33 tries to acquire the consent of the authority(ies). If consent acquisition unit 33 has acquired the consent at this trial, processing unit 31 determines to permit the browsing of the image, generates browsing permission/prohibition transaction data indicating that the browsing of the image is permitted, and provides the generated transaction data to ledger management unit 32. Processing unit 31 also provides identification information on the image permitted to be browsed, to storage device 20.

On the other hand, if consent acquisition unit 33 has not acquired the necessary consent, processing unit 31 determines not to permit the browsing of the image, generates browsing permission/prohibition transaction data indicating that the browsing of the image is not permitted, and provides the generated transaction data to ledger management unit 32.

(4) Processing unit 31 provides transaction data indicating that there is a request to change permission/prohibition information (also referred to as change-request transaction data or second transaction data) to ledger management unit 32. Specifically, upon receiving communication data that includes a request to change permission/prohibition information, processing unit 31 generates change-request transaction data indicating that there is a request to change the permission/prohibition information, and provides the generated transaction data to ledger management unit 32.

(5) Processing unit 31 provides transaction data indicating that a change of permission/prohibition information is permitted or prohibited (also referred to as change-record transaction data) to ledger management unit 32. Specifically, upon receiving communication data that includes a request to change permission/prohibition information on an image in the above processing (4), processing unit 31 references condition types before and after change of the image included in the change request. If this change is a change made to increase the number of authorities whose consent is necessary for browsing, processing unit 31 determines to apply the change when the consent of at least one authority has been acquired. On the other hand, if this change is a change made to reduce a predetermined number of authorities whose consent is necessary for browsing, processing unit 31 determines to apply the change when the consent of all authorities has been acquired.

Then, processing unit 31 causes consent acquisition unit 33 to try to acquire the consent of an authority(ies). If at this trial, consent acquisition unit 33 has acquired the consent of the authority lies) whose consent is necessary for the change, processing unit 31 applies a change of the condition type, generates change-record transaction data indicating the change made to the condition type, and provides the generated transaction data to ledger management unit 32. On the other hand, if acquisition unit 33 has not acquired the consent of an authority(ies) whose consent is necessary for the change, processing unit 31 determines not to apply a change of the condition type, generates change-record transaction data indicating that a change of the condition type is not applied, and provides the generated transaction data to ledger management unit 32.

Ledger management unit 32 is a processing unit that manages the distributed ledgers for managing images, i.e., content. Ledger management unit 32 stores various types of transaction data provided from processing unit 31 in the distributed ledgers. The distributed ledgers store various types of transaction data from the past to the present. Various types of transaction data are managed not to be tampered, on the basis of the characteristic that the information recorded on the distributed ledgers is difficult to tamper.

Ledger management unit 32 includes storage 37 and ledger memory 38.

Storage 37 is a processing unit that stores new transaction data to be stored in the distributed ledger, in ledger memory 38. Using a method depending on the type of the distributed ledger, storage 37 stores new transaction data in ledger memory 38. Storage 37 also transmits and receives communication data to and from storages 37 of other servers among servers 30A and so on and causes each server to store the new transaction data in the ledger memory 38 of the server. For example, in the case where the distributed ledger is a blockchain, storage 37 generates a block that includes new transaction data, synchronizes the generated block among servers 30A and so on, and stores the above block in ledger memory 38.

Ledger memory 38 is a memory device that stores the distributed ledger. The distributed ledger stored in ledger memory 38 stores one or more pieces of transaction data and is managed using characteristics such as a hash value so as to make tampering difficult (described later).

Note that the distributed ledger is, for example, a blockchain, and this case is described as an example. However, other types of distributed ledger (e.g., IOTA or a hash graph) may be employed. Note that, when new data is stored, the distributed ledger may execute a consensus algorithm (e.g., practical byzantine fault tolerance (PBFT), proof of work (PoW), or proof of stake (PoS), or may not execute the consensus algorithm. As one example, Hyperledger fabric is considered as the distributed ledger technique that does not execute a consensus algorithm.

Consent acquisition unit 33 is a processing unit that acquires consent to the browsing of an image. In the case where the consent of an authority(ies) is necessary to browse an image, consent acquisition unit 33 transmits communication data that requests the consent to terminals 40A and so on of the authority(ies) under the control of processing unit 31. Thereafter, if the above authority(ies) has/have consented to the browsing, consent acquisition unit 33 receives, in response to the transmitted communication data, communication data that includes information indicating that the consent to the browsing of the image has been acquired.

Note that part or all of the above-described processing performed by server 30A, e.g., part or all of processing performed by processing unit 31 and consent acquisition unit 33, may be implemented by executing smart contract codes stored in the distributed ledgers of servers 30A and so on. This has an advantage that the above-described processing is automatically executed based on the smart contract codes.

Figure 5:
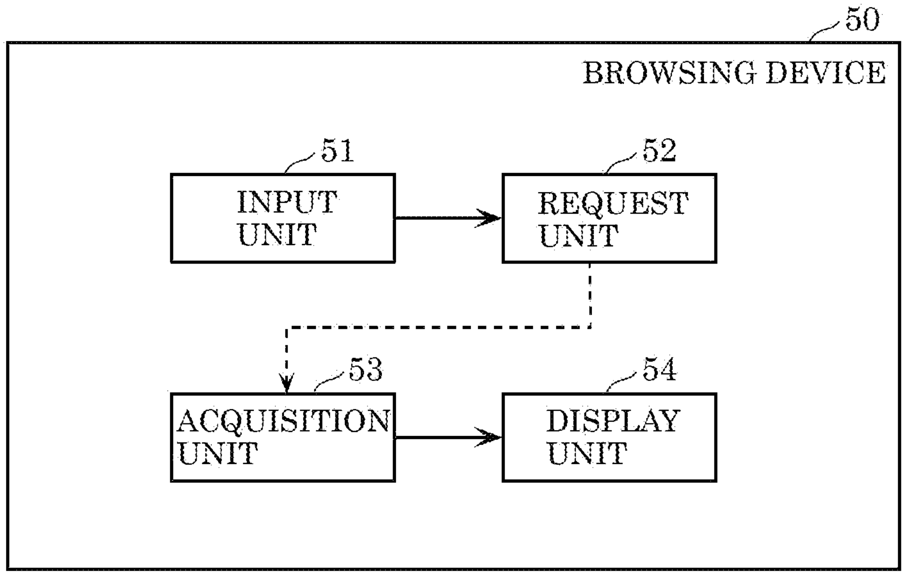
FIG. 5 is a block diagram schematically illustrating a configuration of a browsing device according to the embodiment.

FIG. 5 is a block diagram schematically illustrating a configuration of browsing device 50 according to the present embodiment.

As illustrated in FIG. 5, browsing device 50 includes input unit 51, request unit 52, acquisition unit 53, and display unit 54. The aforementioned functional units of browsing device 50 may be implemented by, for example, a CPU using a memory and executing programs.

Input unit 51 is a processing unit that receives, from user U of browsing device 50, input of identification information on an image desired to be browsed by user U. Input unit 51 receives, from user U of browsing device 50, input of identification information on an image desired to be browsed by user U via an input interface not shown (e.g., a keyboard, a mouse, or a patch panel). For example, input unit 51 displays the filename of an image on a display screen and receives input through an operation performed in the display (e.g., a click operation using a mouse).

Request unit 52 is a processing unit that requests the browsing of an image. Request unit 52 generates browsing-request transaction data that requires the browsing of an image related to the input received by input unit 51 and transmits the generated transaction data to servers 30A and so on.

After the request unit 52 has transmitted the browsing-request transaction data and when the browsing of the image requested to be browsed is permitted, acquisition unit 53 acquires the image from storage device 20.

Display unit 54 is a display device that displays an image acquired by acquisition unit 53. Display unit 54 is, for example, a liquid crystal display or an organic electroluminescence (EL) display.

FIG. 6 is an illustration of pieces of store-request transaction data D1 and D2 according to the present embodiment. One row in FIG. 6 corresponds to one piece of store-request transaction data.

The store-request transaction data illustrated in FIG. 6 includes an image ID, a condition type, an authority, provided date and time, and a signature.

The image ID refers to an identifier of an image provided from providing device 10 to storage device 20.

The condition type refers to information indicating the condition type set for the above image.

The authority refers to information for specifying a person(s) who has/have the authority to permit the browsing of the above image.

The provided date and time refer to information indicating the date and time when the above image has been provided.

The signature is a digital signature affixed by a device or person that/who has generated the store-request transaction data.

Storage-request transaction data D1 illustrated in FIG. 6 is transaction data transmitted from providing device 10 to servers 30A and so on when an image with an image ID of 002 is provided. Storage-request transaction data D1 includes "1" as the condition type, "A, B" as the authority, "2018/07/25 18:15:00" as the provided date and time, and a digital signature of the person A who provided the above image as the signature.

Storage-request transaction data D2 illustrated in FIG. 6 is transaction data transmitted from providing device 10 to servers 30A and so on when providing an image with an image ID of 021. Storage-request transaction data D2 includes a condition type of 3, an authority of X, Y, provided date and time of 2018/07/25 22:00:00, and a digital signature of X who provided the above image.

It can also be said that the store-request transaction data illustrated in FIG. 6 corresponds to an image of content provided by providing device 10 and has a data structure, that includes identification information for uniquely specifying the image managed by content management system 1, permission/prohibition information regarding whether to permit or prohibit the browsing of the image, information indicating the authority(ies) who has/have granted consent to the browsing of the image, information indicating the provided date and time of the image, and the digital signature of the provider who provided the content through providing device 10.

FIG. 7 is an illustration of condition types according to the present embodiment. The condition types illustrated in FIG. 7 are used as the condition types of store-request transaction data D1 or D2 illustrated in FIG. 6.

As illustrated in FIG. 7, the condition types include at least four condition types. For each condition type, FIG. 7 also shows the number of authorities whose consent is necessary in convenient notation. As an example, a case is described in which two subjects are taken in a photograph image, and the subjects serve as authorities.

Condition type 1 is a condition type that permits other persons to browse the photograph without the consent of authorities. According to condition type 1, the number of authorities whose consent is necessary is zero.

Condition type 2 is a condition type that permits other persons to browse the image with the consent of one of authorities. According to condition type 2, the number of authorities whose consent is necessary is one.

Condition type 3 is a condition type that permits other persons to browse the image with the consent of all authorities, i.e., two authorities. According to condition type 3, the number of authorities whose consent is necessary is two.

Condition type 4 is a condition type that prohibits other persons from browsing the image. According to condition type 4, the number of authorities whose consent is necessary can be expressed as an infinite number for the sake of convenience. This indicates that the browsing is not possible irrespective of the number of authorities who have consented to the browsing, i.e., the browsing is not permitted.

Note that the condition types illustrated in FIG. 7 may be defined by the user for each content.

FIG. 8 is an illustration of browsing-request transaction data D3 indicating that there is a request to browse an image, according to the present embodiment.

Browsing-request transaction data D3 illustrated in FIG. 8 includes an image ID, a person who has requested the browsing, requested date and time, and a signature.

The image ID refers to an identifier of the image requested to be browsed.

The person who has requested the browsing refers to information for specifying the person who has requested the browsing of the image.

The requested date and time refer to information indicating the date and time when the request to browse the image has been issued.

The signature refers to a digital signature affixed by a device or person that/who has generated the browsing-request transaction data.

Browsing-request transaction data D3 illustrated in FIG. 8 is transaction data indicating that an image with an image ID of 002 is requested to be browsed. Browsing-request transaction data D3 includes a person who has requested the browsing of P, requested date and time of 2018/07/30 21:10:00, and a digital signature of server 30A that has generated browsing-request transaction data D3.

FIG. 9 is an illustration of browsing permission/prohibition transaction data D4 indicating that the browsing of an image has been permitted, according to the present embodiment.

Browsing permission/prohibition transaction data D4 illustrated in FIG. 9 includes an image ID, a person who has granted consent, permitted date and time, and a signature.

The image ID refers to an identifier of the image permitted to be browsed.

The person who has granted consent refers to information for uniquely specifying the person who has consented to the browsing of the image.

The permitted date and time refer to information indicating the date and time when the browsing of the image has been permitted with the consent to the browsing of the image.

The signature refers to a digital signature affixed by a device or person that/who has generated the browsing permission/prohibition transaction data.

Browsing permission/prohibition transaction data D4 illustrated in FIG. 9 is transaction data indicating that an image with an image ID of 021 has been permitted to be browsed. Browsing permission/prohibition transaction data D4 includes "X, Y" as the persons who have granted consent, "2018/07/30 21:20:00" as the permitted date and time, and a digital signature of server 30A that has generated browsing permission/prohibition transaction data D4 as the signature.

FIG. 10 is an illustration of pieces of change-request transaction data D5 and D6 that are used to request changes in permission/prohibition information according to the present embodiment. One row in FIG. 10 corresponds to one piece of change-request transaction data.

The change-request transaction data illustrated in FIG. 10 includes an image ID, a person who has requested the change, requested date and time, a condition type before change, a condition type after change, and a signature.

The image ID refers to an identifier of the image whose permission/prohibition information has been changed.

The person who has requested the change refers to information for specifying the person who has requested the change in permission/prohibition information.

The requested date and time refer to information indicating the date and time when the request to change permission/prohibition information has been issued.

The condition type before change refers to information indicating the condition type before the change requested by the change-request transaction data.

The condition type after change refers to information indicating the condition type after the change requested by the change-request transaction data.

The signature refers to a digital signature affixed by a device or person that/who has generated the change-request transaction data.

Change-request transaction data D5 illustrated in FIG. 10 is transaction data for changing permission/prohibition information on an image with an image ID of 002. Change-request transaction data D5 includes "P" as the person who has requested the change, "2018/08/15 02:00:00" as the requested date and time, "1" as the condition type before change, "2" as the condition type after change, and a digital signature of the person P who has requested the change as the signature.

Change-request transaction data D6 illustrated in FIG. 10 is transaction data for changing the condition type of an image with an image ID of 021. Change-request transaction data D6 includes "A" as the person who has requested the change, "2018/08/15 22:80:00" as the requested date and time, "2" as the condition type before change, "1" as the condition type after change, and a digital signature of the person A who has requested the change as the signature.

FIG. 11 is an illustration of pieces of change-record transaction data D7 and D8 indicating that the change of permission/prohibition information has been permitted, according to the present embodiment. One row in FIG. 11 corresponds to one piece of change-record transaction data.

The change-record transaction data illustrated in FIG. 11 includes an image ID, a person who has requested the change, a person(s) who has consented to the change, changed date and time, a condition type before change, a condition type after change, and a signature.

The image ID refers to an identifier of the image whose permission/prohibition information has been changed.

The person who has requested the change refers to information for specifying the person who has requested the change of permission/prohibition information.

The person(s) who has consented to the change refers to information for specifying the person(s) who has consented to the change of permission/prohibition information.

The changed date and time refer to information indicating the date and time when the permission/prohibition information has been changed.

The condition type before change refers to information indicating the condition type before the requested change.

The condition type after change refers to information the condition type after the requested change.

The signature refers to a digital signature affixed by a device or person that/who has generated the change-record transaction data.

Change-record transaction data D7 illustrated in FIG. 11 is transaction data used to record a change made to the condition type of an image with an image ID of 002. Change-record transaction data D7 includes "P" as the person who has requested the change, "A" as the person who has consented to the change, "2018/08/15 02:05:00" as the changed date and time, "1" as the condition type before change, "2" as the condition type after change, and a digital signature of server 30A as the signature.

Change-record transaction data D8 illustrated in FIG. 11 is transaction data used to record a change made to the condition type of an image with an image ID of 021. Change-record transaction data D8 includes "A" as the person A who has requested the change, "A, B" as the persons who has consented to the change, "2018/08/15 22:35:00" as the changed date and time, "2" as the condition type before change, "1" as the condition type after change, and a digital signature of server 30A as the signature.

Hereinafter, processing of content management system 1 having the above-described configuration will be described.

Figure 12:
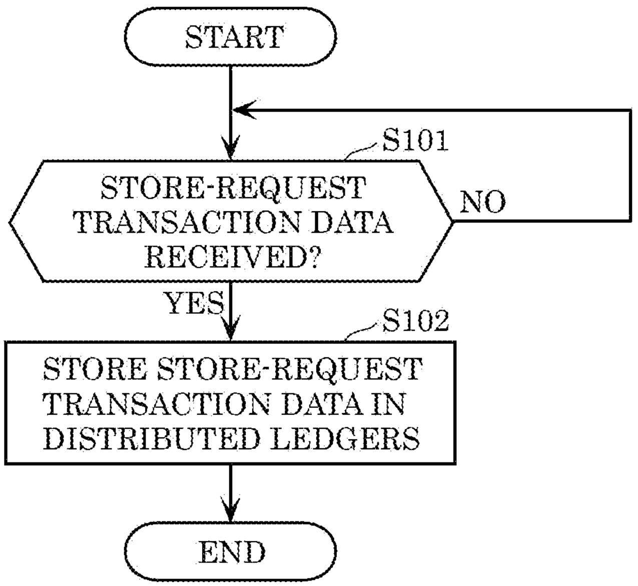
FIG. 12 is a flowchart of processing in which a server receives a provided image, according to the embodiment.

FIG. 12 is a flowchart of processing performed when servers 30A and so on according to the present embodiment have received store-request transaction data As illustrated in FIG. 12, in step S101, processing unit 31 determines whether store-request transaction data has been received. If store-request transaction data has been received (Yes in step S101), the processing proceeds to step S102, and if not (No in step S101), the processing executes step S101. That is, processing unit 31 waits in step S101 until store-request transaction data is received as described above.

In step S102, processing unit 31 provides the store-request transaction data received in step S101 to ledger management unit 32 so as to store the transaction data in the distributed ledger. Processing unit 31 also transmits the above store-request transaction data to the other server 30B and so on so as to store the transaction data in the distributed ledgers of all of the servers 30A and so on.

Through the series of processing illustrated in FIG. 12, the identification information and the permission/prohibition information on the image provided from providing device 10 are stored in the distributed ledgers of servers 30A and so on.

Figure 13:
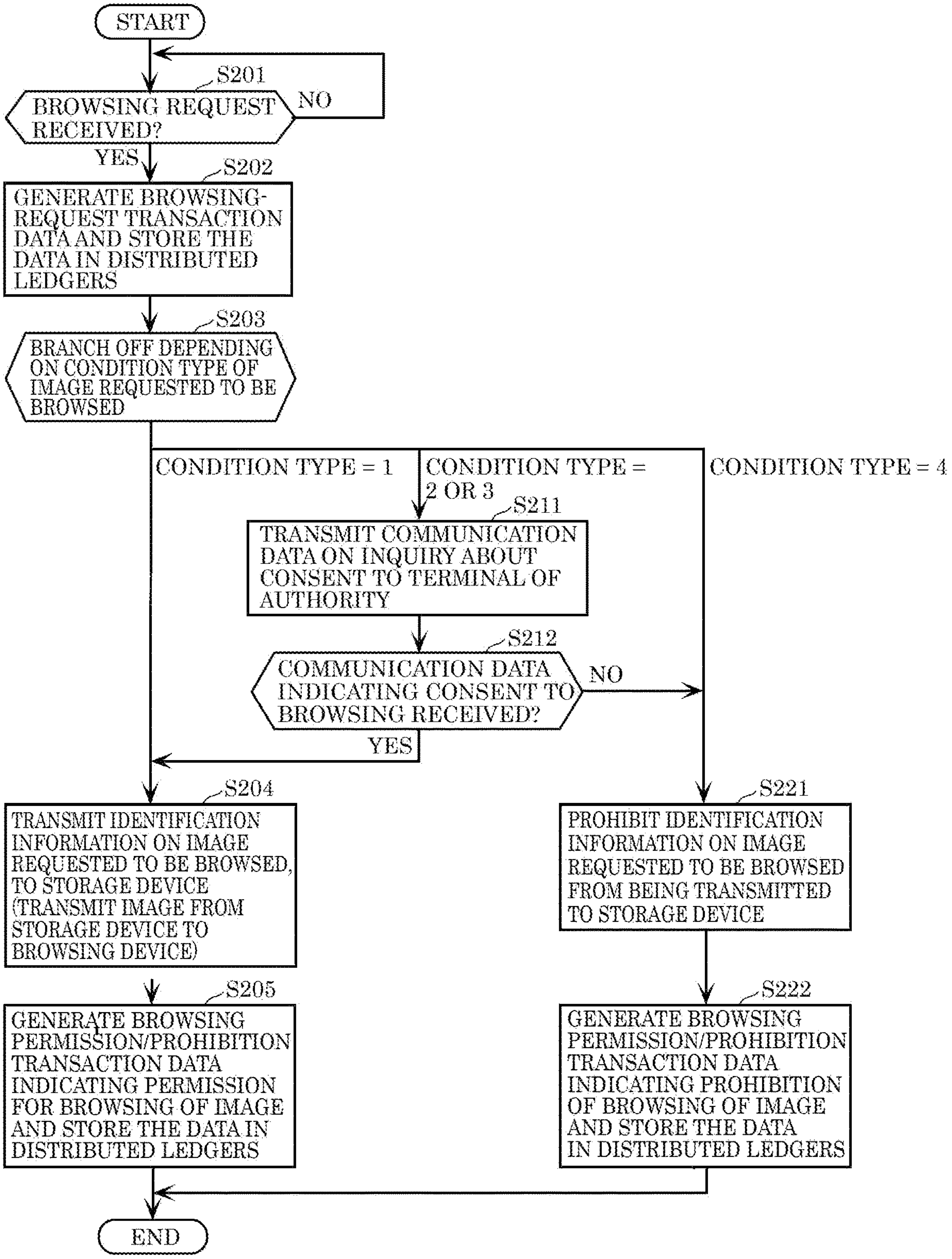
FIG. 13 is a flowchart of processing in which a server controls whether to permit or prohibit the browsing of an image, according to the embodiment.

FIG. 13 is a flowchart of processing performed when servers 30A and so on according to the present embodiment control whether to permit or prohibit the browsing of an image.

As illustrated in FIG. 13, in step S201, processing unit 31 determines whether a request to browse an image has been received from browsing device 50. If a browsing request has been received (Yes in step S201), the processing proceeds to step S202, and if not (No in step S201), the processing executes step S201. That is, processing unit 31 waits in step S201 until a browsing request is received as described above.

In step S202, processing unit 31 generates browsing-request transaction data indicating that there is a browsing request, and provides the generated browsing-request transaction data to ledger management unit 32 so as to store the transaction data in the distributed ledger.

In step S203, the processing branches off depending on the condition type of the image requested to be browsed. In the case of condition type 1, the processing proceeds to step S204, in the case of condition type 2 or 3, the processing proceeds to step S211, and in the case of condition type 4, the processing proceeds to step S221.

In step S204, processing unit 31 transmits identification information on the image requested to be browsed to storage device 20. Accordingly, the image requested to be browsed is transmitted from storage device 20 to browsing device 50. At this time, the consent of authorities is unnecessary.

In step S205, processing unit 31 generates browsing permission/prohibition transaction data indicating that the browsing of the image has been permitted, and provides the generated browsing permission/prohibition transaction data to ledger management unit 32 so as to store the transaction data in the distributed ledger.

In step S211, consent acquisition unit 33 transmits, to terminals 40A and so on, communication data on an inquiry about whether or not the authority(ies) consent(s) to the browsing of the image. In the case of condition type 2, consent acquisition unit 33 transmits the above communication data to terminals 40A and so on of at least one authority, and in the case of condition type 3, consent acquisition unit 33 transmits the above communication data to terminals 40A and so on of all authorities.

In step S212, consent acquisition unit 33 determines whether a necessary number of pieces of communication data that indicate consent to the browsing of the image has been received from terminals 40A and so on, in response to the communication data transmitted to step S211. If the necessary number of pieces of communication data has been received (Yes in step S212), the processing proceeds to step S204, and if not (No in step S212), the processing proceeds to step S221.

In step S221, processing unit 31 does not transmit identification information on the image requested to be browsed to storage device 20, i.e., prohibits the transmission of the above identification information. In this case, the image requested to be browsed is not transmitted from storage device 20 to browsing device 50.

In step S222, processing unit 31 generates browsing permission/prohibition transaction data indicating that the browsing of the image is not permitted, and provides the generated browsing permission/prohibition transaction data to ledger management unit 32 so as to store the transaction data in the distributed ledger.

Through the series of processing illustrated in FIG. 13, the information indicating that a request to browse the image has been issued and whether or not the browsing of the image has been permitted at the browsing request is stored in the distributed ledgers of servers 30A and so on.

Figure 14:
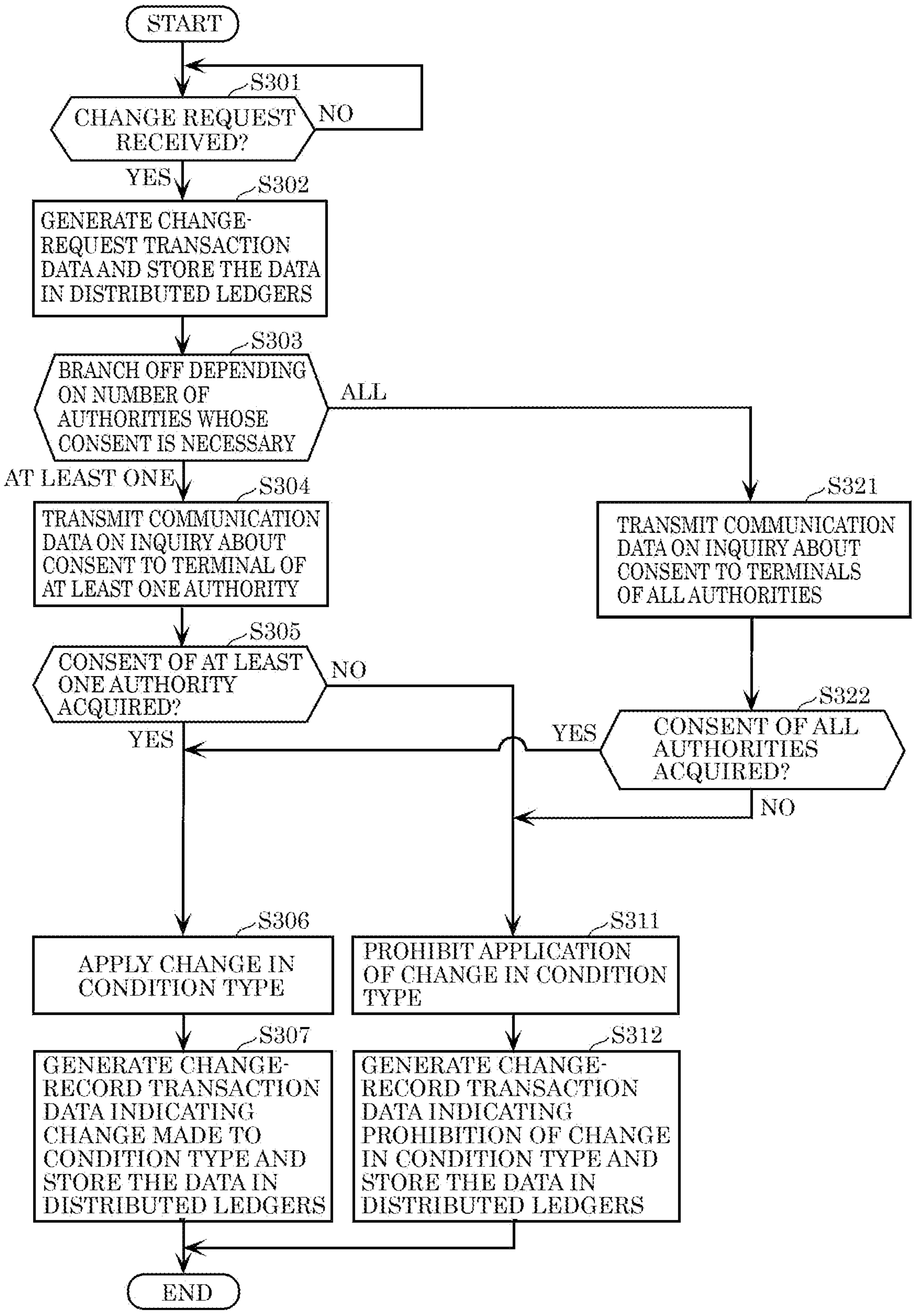
FIG. 14 is a flowchart of processing in which a server controls a change that is made to the condition type, according to the embodiment.

FIG. 14 is a flowchart of processing performed when servers 30A and so on according to the present embodiment control a change that is made to the condition type.

As illustrated in FIG. 14, in step S301, processing unit 31 determines whether a request to change the condition type has been received. If a change request has been received (Yes in step S301), the processing proceeds to step S302, and if not (No in step S301), the processing executes step S301. That is, processing unit 31 waits in step S301 until a change request is received as described above.

In step S302, processing unit 31 generates change-request transaction data indicating that there is a change request, and provides the generated change-request transaction data to ledger management unit 32 so as to store the transaction data in the distributed ledger.

In step S303, processing unit 31 causes the processing to branch off depending on the number of persons whose consent is necessary to change the condition type. If the number of persons whose consent is necessary is at least one of authorities ("at least one" in step S303), the processing proceeds to step S304, and if the number of persons whose consent is necessary corresponds to the number of all of the authorities ("all" in step S303), the processing proceeds to step S321.

In step S304, consent acquisition unit 33 transmits communication data on an inquiry about whether or not to consent to the change, to terminals 40A and so on of at least one of the above authorities in order to acquire the consent to the change from at least one of authorities of the image requested to change.

In step S305, consent acquisition unit 33 determines whether communication data that includes information indicating the consent to the change has been received from at least one of the above authorities, in response to the communication data transmitted in step S304. If the above communication data has been received (Yes in step S305), the processing proceeds to step S306, and if not (No in step S305), the processing proceeds to step S311.

In step S306, processing unit 31 applies a change of the condition type.

In step S307, processing unit 31 generates change-record transaction data indicating that the condition type has been changed, and provides the generated change-record transaction data to ledger management unit 32 so as to store the transaction data in the distributed ledger.

In step S311, processing unit 31 prohibits the application of a change of the condition type.

In step S312, processing unit 31 generates change-record transaction data indicating that the change of the condition type is prohibited, and provides the generated change-record transaction data to ledger management unit 32 so as to store the transaction data in the distributed ledger.

In step S321, consent acquisition unit 33 transmits communication data on an inquiry about whether or not to consent to the change, to terminals 40A and so on of all of the above authorities in order to acquire the consent to the change from all of the authorities determined for the image requested to be changed.

In step S322, consent acquisition unit 33 determines whether communication data that includes information indicating the consent to the change has been received from all of the above authorities, in response to the communication data transmitted in step S321. if the above communication data has been received (Yes in step S322), the processing proceeds to step S306, and if not (No in step S322), the processing proceeds to step S311.

Through the series of processing illustrated in FIG. 14, the information indicating that a request to change permission/prohibition information has been issued and whether or not the permission/prohibition information has been changed at the change request is stored in the distributed ledgers of servers 30A and so on.

Hereinafter, overall processing of content management system 1 will be described.

Figure 15:
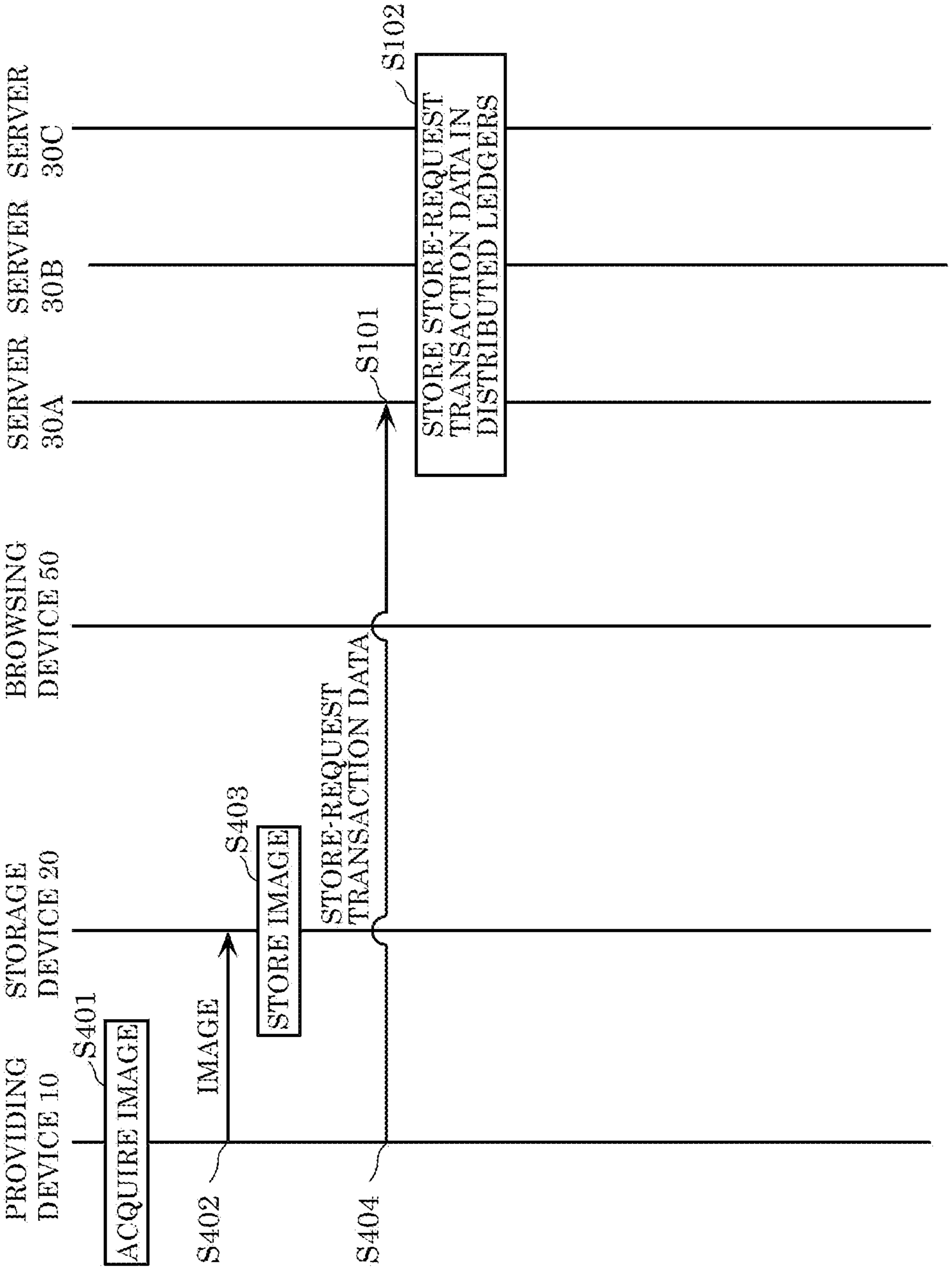
FIG. 15 is a sequence diagram illustrating processing of each device performed when the providing device provides an image to a server, according to the embodiment.

FIG. 15 is a sequence diagram illustrating processing of each device performed when providing device 10 provides an image to servers 30A and so on, according to the present embodiment. Steps that are the same as those in the processing illustrated in the flowchart in FIG. 12 are given the same reference numerals as in FIG. 12, and a detailed description thereof shall be omitted.

First, providing device 10 acquires an image (step S401) and provides the acquired image to storage device 20 (step S402). Storage device 20 acquires the provided image and stores the image in memory device 22 (step S403).

Thereafter, providing device 10 transmits store-request transaction data that includes the condition type and the identification information on the image provided in step S402 to server 30A (step S404). Server 30A receives the transmitted store-request transaction data and stores the received store-request transaction data in the distributed ledgers of servers 30A and so on (steps S101 and S102).

Through the series of processing illustrated in FIG. 15, the image provided by providing device 10 is stored in storage device 20, and the identification information and the permission/prohibition information on the image are stored in the distributed ledgers of servers 30A and so on.

Figure 16:
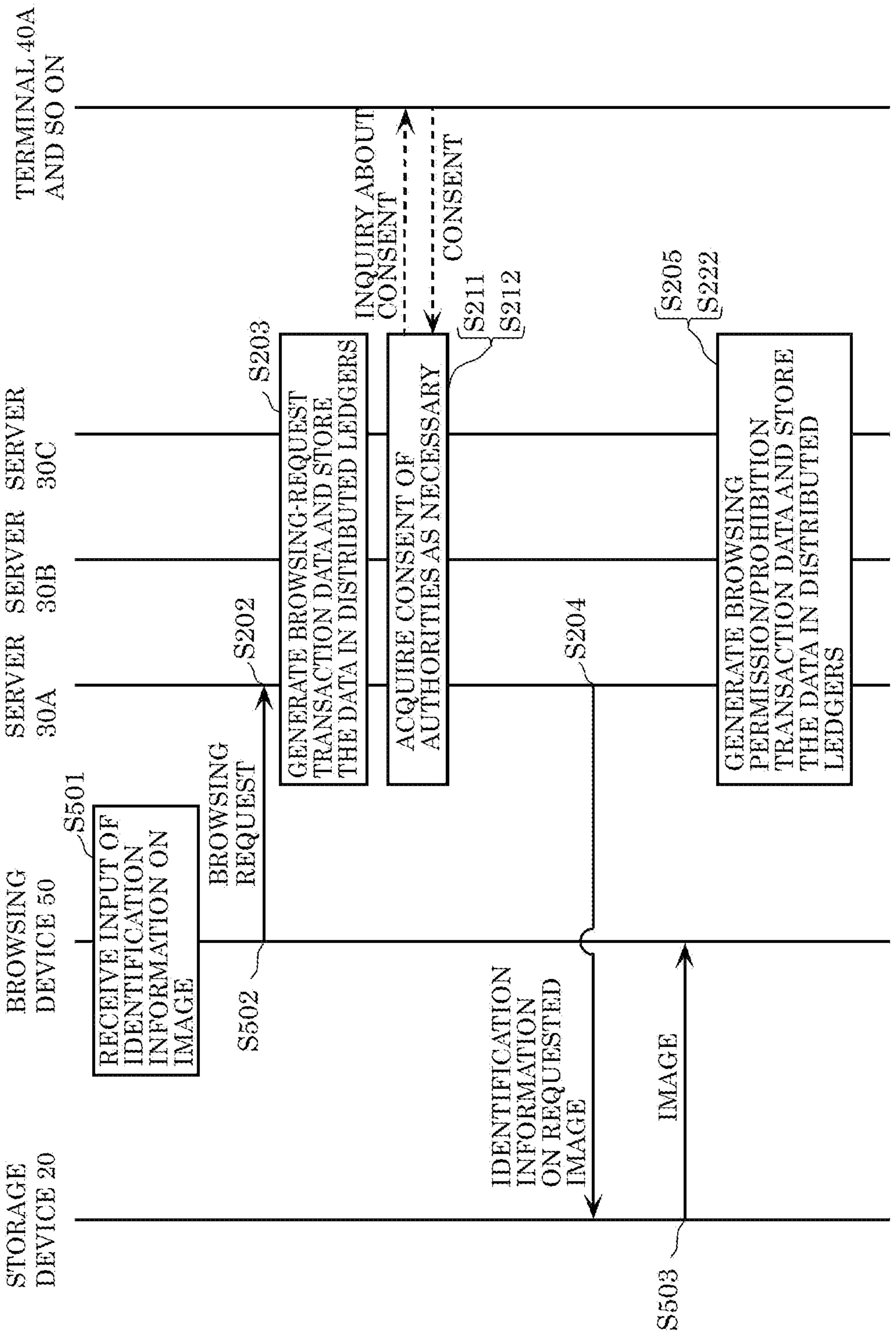
FIG. 16 is a sequence diagram illustrating processing of each device performed when the browsing device acquires and displays an image, according to the embodiment.

FIG. 16 is a sequence diagram illustrating processing of each device performed when browsing device 50 acquires and displays an image, according to the present embodiment. Steps that are the same as those in the processing illustrated in the flowchart in FIG. 13 are given the same reference numerals as in FIG. 13, and a detailed description thereof shall be omitted.

First, browsing device 50 receives input of identification information on an image desired to be browsed by user U (step S501). Browsing device 50 transmits a browsing request including the above identification information to server 30A (step S502).

Server 30A generates browsing-request transaction data and stores the generated browsing-request transaction data in the distributed ledgers of servers 30A and so on (step S203). When it is necessary to receive permission to browse the image from an authority(ies), server 30A exchanges communication data with terminals 40A and so on of the authority(ies) to obtain the permission from the authority(ies) (steps S203, S211, and S212).

When the necessary permission has been obtained, server 30A transmits the identification information on the image requested to be browsed to storage device 20 (step S204), and accordingly storage device 20 transmits the image to browsing device 50 (step S503). Server 30A also generates browsing permission/prohibition transaction data indicating whether or not the browsing of the image has been permitted, and stores the generated transaction data in the distributed ledgers of servers 30A and so on (steps S205 and S222).

Through the series of processing illustrated in FIG. 16, information indicating that a request to browse the image has been issued and whether or not the browsing of the image has been permitted at the browsing request is stored in the distributed ledgers of servers 30A and so on. The image permitted to be browsed is displayed by browsing device 50 and browsed by user U.

Figure 17:
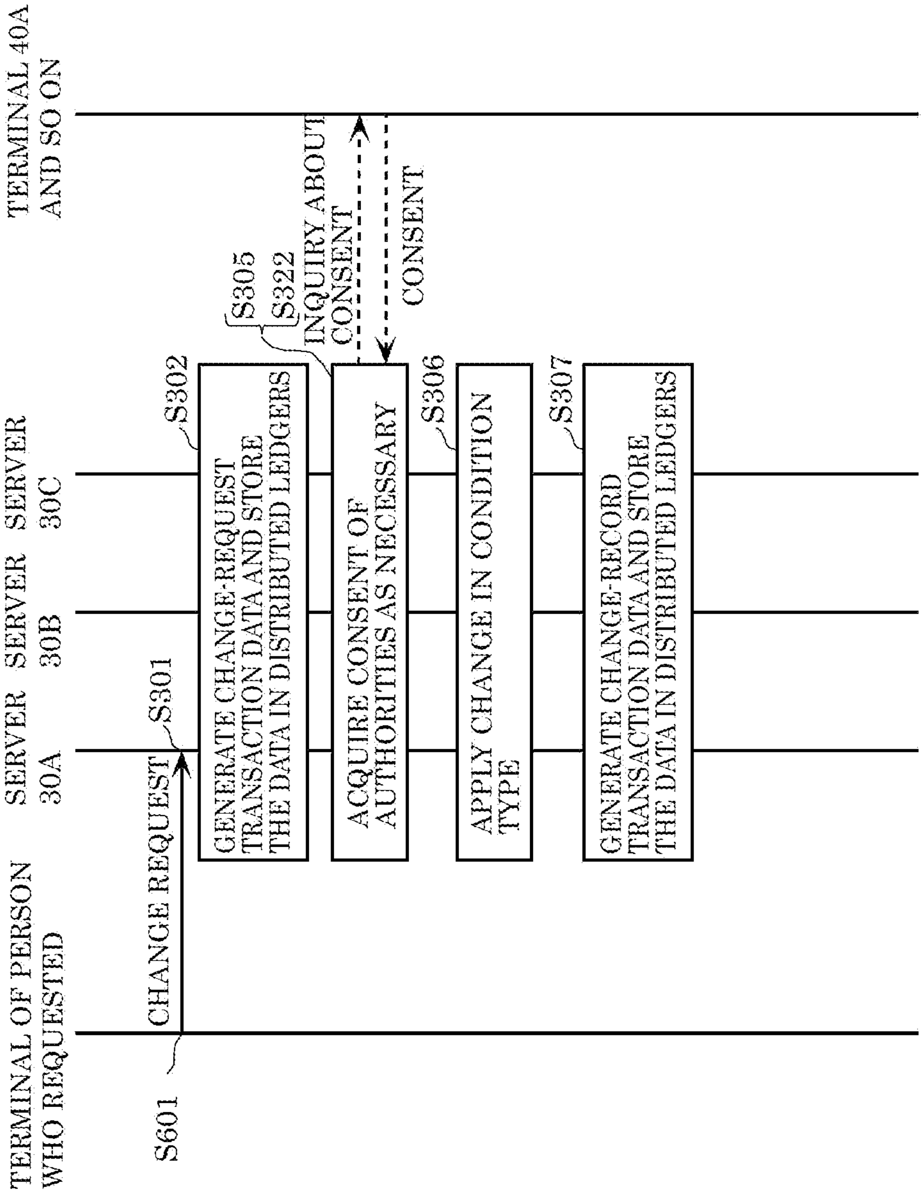
FIG. 17 is a sequence diagram illustrating processing of each device performed when the condition type is changed, according to the embodiment.

FIG. 17 is a sequence diagram illustrating processing of each device performed when the condition type is changed, according to the present embodiment. Steps that are the same as those in the processing illustrated in the flowchart in FIG. 14 are given the same reference numerals as in FIG. 14, and a detailed description thereof shall be omitted.

First, the terminal of a person who requests to change the condition type transmits a request to change the condition type to server 30A (step S601).

Upon receiving the change request transmitted in step S601 (step S301), server 30A generates change-request transaction data and stores the generated change-request transaction data in the distributed ledgers of servers 30A and so on (step S302). When it is necessary to receive permission to change the condition type from an authority(ies), server 30A exchanges communication data with terminal 40A and so on of the authority(ies) to obtain the permission from the authority(ies) (steps S305 and S322).

When the necessary permission has been obtained, server 30A changes the condition type of the image (step S306), generates change-record transaction data indicating that the condition type has been changed, and stores the generated change-record transaction data in the distributed ledgers (step S307).

Through the series of processing illustrated in FIG. 17, information indicating that a request to change the permission/prohibition information has been issued and whether or not the permission/prohibition information has been changed at the change request is stored in the distributed ledgers of servers 30A and so on. When the permission/prohibition information has been changed, subsequent browsing is controlled in accordance with the changed permission/prohibition information.

A blockchain according to the above-described embodiment is elaborated on below.

Figure 18:
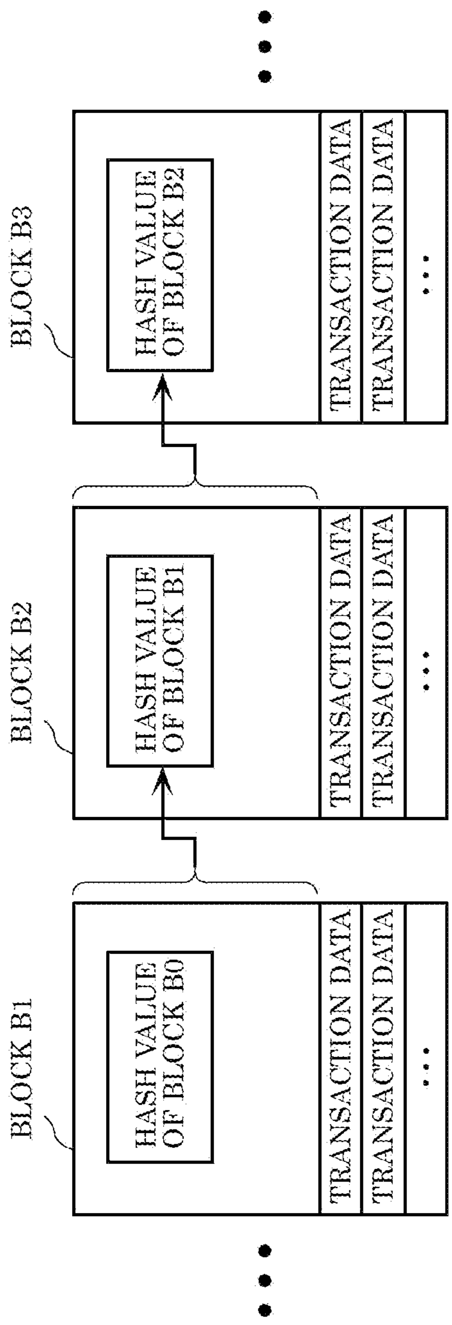
FIG. 18 is an illustration of a data structure of a blockchain.

FIG. 18 is an illustration of a data structure of a blockchain.

The blockchain is configured by connecting blocks, each being a record unit, in a chain. Each block includes a plurality of pieces of transaction data and a hash value of the immediately preceding block. Specifically, block B2 includes the hash value of immediately preceding block B1. Then, a hash value calculated from the plurality of pieces of transaction data included in block B2 and the hash value of block is included in block B3 as the hash value of block B2. By in this way connecting blocks in a chain while including the content of the previous block as a hash value, tampering of the recorded transaction data can be effectively prevented.

If past transaction data has been changed, the hash values of subsequent blocks become different from the hash values before change, and in order to make tampered blocks look like correct blocks, it is necessary to recreate all subsequent blocks. This operation is realistically extremely difficult. This characteristic is used to assure difficulty in tampering a blockchain.

Figure 19:
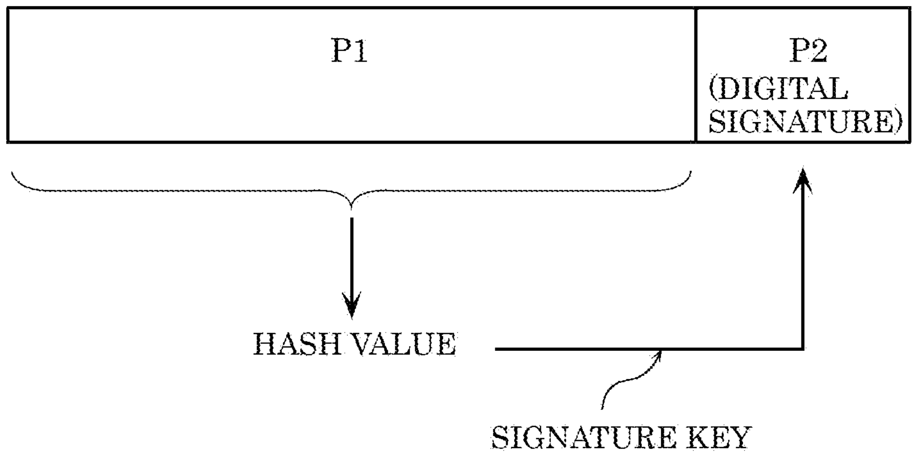
FIG. 19 is an illustration of a data structure of transaction data.

FIG. 19 is an illustration of a data structure of transaction data.

The transaction data illustrated in FIG. 19 includes transaction main body P1 and digital signature P2. Transaction main body P1 is a data main body included in the transaction data. Digital signature P2 is generated by signing for the hash value of transaction main body P1, using a signature key of the creator of the transaction data, and more specifically, by encrypting the transaction data, using a secret key of the creator.

The transaction data including digital signature P2 is substantially impossible to tamper. This prevents tampering of the transaction main body.

As described above, the servers according to the present embodiment store information regarding whether to permit or prohibit the browsing of content as transaction data in the distributed ledgers. Since the transaction data stored in the distributed ledgers is substantially impossible to tamper, it is possible to appropriately manage the information regarding whether to permit or prohibit the browsing of content, including the history of changes made to the information. Accordingly, the control method according to the present disclosure enables appropriately managing whether to permit or prohibit the browsing of content.

The servers also reference the transaction data stored in the distributed ledgers and determine whether to permit or prohibit the browsing of content. Since the transaction data is substantially impossible to tamper, it is possible to appropriately determine permission to browse content on the basis of the transaction data. Accordingly, the control method according to the present disclosure enables appropriately managing whether to permit or prohibit the browsing of content.

When content is managed such that the browsing of the content is permitted with the consent of an authority(ies), the servers permit the browsing when the consent of the authority(ies) has been acquired at a request to browse the content. Also, the condition that browsing is permitted with the consent of an authority(ies) is appropriately managed as transaction data in the distributed ledgers. In this way, the content management system enables appropriately managing whether to permit or prohibit the browsing of content while at the same time acquiring the consent of an authority(ies).

A subject of content, e.g., a photograph or a moving image, serves as an authority, and the servers control whether to permit or prohibit the browsing of the content with the consent of the subject serving as the authority. In this way, the content management system enables appropriately managing whether to permit or prohibit the browsing of content while at the same time acquiring the consent of the subject of the content.

The servers also store changes made to permission/prohibition information as transaction data in the distributed ledgers. Since the transaction data stored in the distributed ledgers is substantially impossible to tamper, it is possible to appropriately manage information regarding the permission/prohibition information, including the history of changes made to the information. Accordingly, the control method according to the present disclosure enables appropriately managing whether to permit or prohibit the browsing of content.

In each of the cases where the number of persons whose consent is necessary is increased in order to permit the browsing of content and where this number is reduced in order to permit the browsing of content, the servers apply the change with appropriate consent. The aforementioned change made to increase the number of persons imposes more restrictions on the browsing of content, and therefore can be applied with relatively mild consent. On the other hand, the aforementioned change made to reduce the number of persons imposes less restrictions on the browsing of content, and therefore can be applied with relatively severe consent. Using this characteristic of the changes, the content management system enables applying changes to the permission/prohibition information with the consent level that depends on the details of the change. Accordingly, the control method according to the present disclosure enables appropriately managing whether to permit or prohibit the browsing of content with more flexibility, using the characteristic of changes made to in the permission/prohibition information.

The servers automatically execute a series of processing, such as the management of information regarding whether to permit or prohibit the browsing of content, in accordance with smart contact codes stored in the distributed ledgers and without intervention of the other persons or the other systems. Accordingly, the series of processing can be implemented with a higher level of safety by smart contract. It is thus possible to more appropriately manage whether to permit or prohibit the browsing of content.

The servers execute the consensus algorithm to store transaction data in the distributed ledgers. The execution of the consensus algorithm makes it easier to appropriately mange whether to permit or prohibit the browsing of content.

In the above-described embodiment, each constituent element may be configured as dedicated hardware, or may be implemented or realized by executing a software program suitable for each constituent element. Each constituent element may also be implemented or realized by a program execution part, such as a CPU or a processor, reading out and executing a software program recorded on a hard disk or a recording medium such as a semiconductor memory. Here, software that embodies the content management system according to the above-described embodiment refers to the following program.

That is, this program causes a computer to execute a control method that is used in a content management system including a plurality of servers, each holding a distributed ledger, and that is executed by one of the servers. The control method includes acquiring first transaction data from a providing device and storing the acquired first, transaction data in the distributed ledgers of the servers, the first transaction data including identification information on content provided by the providing device, and permission/prohibition information regarding whether to permit or prohibit the browsing of the content.

Although the content management system and the like according to one or a plurality of aspects have been described in detail above with reference to one embodiment, the present disclosure is not limited to the present embodiment. The present disclosure also includes modes obtained by making various modifications conceivable by those skilled in the art to the present embodiment and modes constituted by any combination of constituent elements in different embodiments without departing from the scope of the present disclosure.

INDUSTRIAL APPLICABILITY

The present disclosure is applicable to a content management system that appropriately manages whether to permit or prohibit the browsing of content.

What is claimed is:

1. A control method that is used in a content management system including a server, and that is executed by the server, the control method comprising:

acquiring first transaction data from a providing device, the first transaction data including permission/prohibition information regarding whether to permit or prohibit browsing of content in which one or more persons are captured as a subject, the subject being the one or more persons captured in the content, the permission/prohibition information including at least (i) a first condition type indicating that browsing of the content is permitted when consent of one of the one or more persons is acquired or (ii) a second condition type indicating that browsing of the content is permitted when consent of all of the one or more persons is acquired; and storing the acquired first transaction data including the permission/prohibition information in a distributed ledger, wherein the control method further comprises:

when a browsing request to browse the content is received from a browsing device, determining which one of the first condition type and the second condition type is included in permission/prohibition information included in the first transaction data stored in the distributed ledger, the first condition type indicating that browsing of the content is permitted when consent of one of the one or more persons is acquired, the second condition type indicating that browsing of the content is permitted when consent of all of the one or more persons is acquired;

when the permission/prohibition information includes the first condition type, (i) inquiring about whether or not to consent to the browsing to one of the one or more persons and (ii) when consents from the one of the one or more persons are acquired, causing a storage device storing the content to transmit the content to the browsing device; and when the permission/prohibition information includes the second condition type, (i) inquiring about whether or not to consent to the browsing to all of the one or more persons and (ii) when consents from the all of the one or more persons are acquired, causing the storage device storing the content to transmit the content to the browsing device, and wherein part or all of processing according to the control method is implemented by executing a smart contract code stored in the distributed ledger, the distributed ledger being held by each of a plurality of servers including the server.

2. The control method according to claim 1, further comprising:

receiving second transaction data that includes information regarding a change in the permission/prohibition information; and storing the second transaction data received in the distributed ledger.

3. The control method according to claim 2, further comprising:

when the second transaction data received includes information regarding a change made to increase a total number of persons whose consent is necessary to permit the browsing of the content, applying the change when information indicating consent to the change is received from at least one of one or more persons; and when the second transaction data received includes information regarding a change made to reduce the total number of persons whose consent is necessary to permit the browsing of the content, applying the change when information indicating consent to the change is received from all of the one or more persons.

4. The control method according to claim 1, wherein, when the first transaction data is stored in the distributed ledger, each of the plurality of servers including the server executes a consensus algorithm to store the first transaction data in the distributed ledger.

5. A content management system including a server, the content management system comprising:

a processor; and a non-transitory memory having stored therein executable instructions, which when executed by the processor, cause the processor to perform:

acquire first transaction data from a providing device, the first transaction data including permission/prohibition information regarding whether to permit or prohibit browsing of the content in which one or more persons are captured as a subject, the subject being the one or more persons captured in the content, the permission/prohibition information including at least (i) a first condition type indicating that browsing of the content is permitted when consent of one of the one or more persons is acquired or (ii) a second condition type indicating that browsing of the content is permitted when consent of all of the one or more persons is acquired; and store the acquired first transaction data including the permission/prohibition information in a distributed ledger, wherein the processor further performs:

when a browsing request to browse the content is received from a browsing device, determine which one of the first condition type and the second condition type is included in permission/prohibition information included in the first transaction data stored in the distributed ledger, the first condition type indicating that browsing of the content is permitted when consent of one of the one or more persons is acquired, the second condition type indicating that browsing of the content is permitted when consent of all of the one or more persons is acquired;

when the permission/prohibition information includes the first condition type, (i) inquire about whether or not to consent to the browsing to one of the one or more persons and (ii) when consents from the one of the one or more persons are acquired, cause a storage device storing the content to transmit the content to the browsing device; and when the permission/prohibition information includes the second condition type, (i) inquire about whether or not to consent to the browsing to all of the one or more persons and (ii) when consents from the all of the one or more persons are acquired, cause the storage device storing the content to transmit the content to the browsing device, and wherein part or all of processing performed by the processor is implemented by executing a smart contract code stored in the distributed ledger, the distributed ledger being held by each of a plurality of servers including the server.

6. A non-transitory computer-readable recording medium having a computer program recorded thereon for causing a computer to execute the control method according to claim 1.

7. A non-transitory computer-readable recording medium having stored thereon a data structure used in a content management system that includes a server, wherein the data structure is included in first transaction data stored in a distributed ledger, wherein the first transaction data includes:

permission/prohibition information regarding whether to permit or prohibit browsing of the content in which one or more persons are captured as a subject;

information indicating an authority whose consent is necessary to permit browsing of the content;

information indicating date and time when the content are provided; and a digital signature of a provider that has provided the content via the providing device, and wherein the permission/prohibition information includes at least (i) a first condition type indicating that browsing of the content is permitted when consent of one of the one or more persons is acquired or (ii) a second condition type indicating that browsing of the content is permitted when consent of all of the one or more persons is acquired, wherein when a browsing request to browse the content is received from a browsing device, the content management system determines which one of the first condition type and the second condition type is included in permission/prohibition information included in the first transaction data stored in the distributed ledger, the first condition type indicating that browsing of the content is permitted when consent of one of the one or more persons is acquired, the second condition type indicating that browsing of the content is permitted when consent of all of the one or more persons is acquired, wherein when the permission/prohibition information includes the first condition type, (i) the content management system inquires about whether or not to consent to the browsing to one of the one or more persons and (ii) when consents from the one of the one or more persons are acquired, the content management system causes a storage device storing the content to transmit the content to the browsing device, wherein when the permission/prohibition information includes the second condition type, (i) the content management system inquires about whether or not to consent to the browsing to all of the one or more persons and (ii) when consents from the all of the one or more persons are acquired, the content management system causes the storage device storing the content to transmit the content to the browsing device, and wherein part or all of processing performed by the content management system is implemented by executing a smart contract code stored in the distributed ledger, the distributed ledger being held by each of a plurality of servers including the server.

8. The control method according to claim 1, wherein the permission/prohibition information uniquely identifies the subject as granting consent when the consent of the subject is acquired.

* * * * *